United States Patent
Buisman et al.

(10) Patent No.: US 9,325,798 B1
(45) Date of Patent: Apr. 26, 2016

(54) INCENTIVIZING USER GENERATED CONTENT CREATION

(71) Applicant: GOOGLE INC., Mountain View, CA (US)

(72) Inventors: Hylke Niekele Buisman, Zurich (CH); Gerard Sanz, Zurich (CH)

(73) Assignee: Google Inc., Mountain View, CA (US)

( * ) Notice: Subject to any disclaimer, the term of this patent is extended or adjusted under 35 U.S.C. 154(b) by 465 days.

(21) Appl. No.: 13/937,094

(22) Filed: Jul. 8, 2013

(51) Int. Cl.
*G06F 17/30* (2006.01)
*H04L 29/08* (2006.01)

(52) U.S. Cl.
CPC .......... *H04L 67/22* (2013.01); *G06F 17/30241* (2013.01)

(58) Field of Classification Search
CPC .......................... G06F 17/30241; H04L 67/22
USPC .......................................................... 707/724
See application file for complete search history.

(56) References Cited

U.S. PATENT DOCUMENTS

| | | | | |
|---|---|---|---|---|
| 7,409,362 | B2 * | 8/2008 | Calabria | G06Q 10/10 705/26.1 |
| 7,895,177 | B2 * | 2/2011 | Wu | G06Q 30/02 707/706 |
| 9,105,039 | B2 * | 8/2015 | Kramer | G06Q 30/02 |
| 9,210,228 | B2 * | 12/2015 | Williams | H04L 67/22 |
| 2007/0124721 | A1 * | 5/2007 | Cowing | G06F 17/30041 717/100 |
| 2007/0161382 | A1 * | 7/2007 | Melinger | H04L 67/18 455/456.1 |
| 2009/0240564 | A1 * | 9/2009 | Boerries | G06Q 30/0255 709/204 |
| 2011/0238755 | A1 * | 9/2011 | Khan | G06Q 50/01 709/204 |
| 2012/0095862 | A1 * | 4/2012 | Schiff | G06Q 30/06 705/26.7 |
| 2012/0143952 | A1 * | 6/2012 | von Graf | G06Q 50/01 709/204 |
| 2012/0253918 | A1 * | 10/2012 | Marois | G06Q 30/02 705/14.39 |
| 2013/0006735 | A1 * | 1/2013 | Koenigsberg | G06Q 30/02 705/14.12 |
| 2013/0053149 | A1 * | 2/2013 | Rouse | A63F 13/12 463/42 |
| 2013/0095857 | A1 * | 4/2013 | Garcia | H04W 4/02 455/456.3 |
| 2013/0110825 | A1 * | 5/2013 | Henry | G06F 17/30864 707/723 |
| 2013/0262203 | A1 * | 10/2013 | Frederick | G06Q 30/0209 705/14.12 |
| 2014/0095304 | A1 * | 4/2014 | Ganesh | G06Q 30/02 705/14.49 |
| 2014/0164511 | A1 * | 6/2014 | Williams | H04L 67/306 709/204 |

(Continued)

OTHER PUBLICATIONS

Shankar, Pravin, et al., "Crowds replace Experts: Building Better Location-based Services using Mobile Social Network Interactions", PerCom 2012, Lugano, Switzerland, Mar. 19-23, 2012, pp. 20-29.*
Cuel, Roberta, et al., "Making your Semantic Application addictive: incentivizing users!", WIMS '12, Craiova, Romania, Jun. 13- 15, 2012, Article 4, pp. 1-8.*

(Continued)

*Primary Examiner* — Robert Stevens
(74) *Attorney, Agent, or Firm* — Lerner, David, Littenberg, Krumholz & Mentlik, LLP

(57) ABSTRACT

Systems, methods, and machine-readable media for incentivizing user generated content creation are provided. One or more points of interest for including in a notification to a user may be identified based on a location of a client device associated with the user and/or user interest signals. The identified points of interest may be scored by comparing the user interest signals, and a most relevant point of interest may be identified from the scored points of interest. A notification type may be determined based on the most relevant point of interest and the corresponding user interest signal, and used to provide to the user a notification including the most relevant point of interest and the user interest signal. A subsequent notification asking the user to generate content for the most relevant point of interest may be sent, in a case it is determined that the user acts on the provided notification.

20 Claims, 6 Drawing Sheets

(56) References Cited

U.S. PATENT DOCUMENTS

2014/0207866 A1* 7/2014 Garcia .................... H04W 4/02
 709/204
2014/0236704 A1* 8/2014 Billmaier ........... G06Q 30/0251
 705/14.39

OTHER PUBLICATIONS

Gaonkar, Shravan, et al., "Micro-Blog: Sharing and Querying Content Through Mobile Phones and Social Participation", MobiSys '08, Breckenridge, CO, Jun. 17-20, 2008, pp. 174-186.*

Tang, Karen P., et al., "Rethinking Location Sharing: Exploring the Implications of Social-Driven vs. Purpose-Driven Location Sharing", UbiComp 2010, Copenhagen, Denmark, Sep. 26-29, 2010, pp. 85-94.*

Ra, Moo-Ryong, et al., "Medusa: A Programming Framework for Crowd-Sensing Applications", MobiSys '12, Low Wood Bay, Lake District, UK, Jun. 25-29, 2012, pp. 337-350.*

Chen, Xiao, et al., "Crowdsourcing for On-street Smart Parking", DIVANet '12, Paphos, Cyprus, Oct. 21-22, 2012, pp. 1-7.*

Yan, Tingxin, et al., "CrowdPark: A Crowdsourcing-based Parking Reservation System for Mobile Phones", Auto '93, Antonio, TX, Sep. 20-23, 1993, pp. 367-375.*

* cited by examiner

INCENTIVIZING USER GENERATED CONTENT CREATION

TECHNICAL FILED

The present description relates generally to social networking, and more particularly, but not exclusively, to incentivizing user generated content creation.

BACKGROUND

For a rich online experience, user generated content is quite important. User generated content may include, but is not limited to, photographs, reviews, information about where a user has checked in, and the places he or she has visited. Online experiences that are location-based may rely on user generated content even more heavily than other online experiences. For example, when people go online to find the nearest place of interest (e.g., a restaurant, a cafe, a bar, a store, etc.) near their current location, for instance when they are travelling, they may be interested in knowing whether a friend is visiting that place at that time or has already been at that place, or to see reviews about the place. As the number of places stored in location databases grows, the need for crowd sourcing generation of content related to the stored places increases. Therefore, incentivizing user generated content may play a significant role in providing an enriched online experience for a vast population of online users.

SUMMARY

The subject disclosure relates generally to social networking, and more particularly to incentivizing the creation of user generated content.

According to one or more aspects of the subject technology, a computer implemented method for incentivizing creation of user-generated content may include identifying one or more points of interest for including in a notification to a user based on a location of a client device associated with the user or user interest signals that associate the points of interest with the user. Each of the identified one or more points of interest may be scored by comparing the user interest signals of the identified one or more points of interest used to identify the one or more points of interest. A most relevant point of interest may be identified from the scored one or more points of interest. A notification type may be determined that corresponds to the most relevant point of interest and the user interest signal associated with the most relevant point of interest. A notification may be generated that includes the most relevant point of interest and the user interest signal, according to the determined notification type. The generated notification may be provided to the user. A determination may be made of whether the user acts on the provided notification. A subsequent notification may be sent asking the user to generate content for the most relevant point of interest, in a case the user acts on the provided notification.

According to one or more aspects of the subject technology, a system for incentivizing creation of user-generated content may include memory to store instructions and a processor configured to execute the instructions to perform the following acts: identifying one or more points of interest for including in a notification to a user based at least on a location of a client device associated with the user or user interest signals that associate the points of interest with the user; scoring each of the identified one or more points of interest by comparing the user interest signals of the identified one or more points of interest used to identify the one or more points of interest; identifying a most relevant point of interest from the scored one or more points of interest; determining a notification type that corresponds to the most relevant point of interest and the user interest signal associated with the most relevant point of interest; generating a notification including the most relevant point of interest and the user interest signal, according to the determined notification type; providing the generated notification to the user; determining whether the user acts on the provided notification; and sending a subsequent notification asking the user to generate content for the most relevant point of interest, in a case the user acts on the provided notification.

According to one or more aspects of the subject technology, a non-transitory machine-readable medium may include instructions stored therein, which when executed by a machine, cause the machine to perform the following operations: identifying one or more points of interest for including in a notification to a user based at least on a location of a client device associated with the user or user interest signals that associate the points of interest with the user; scoring each of the identified one or more points of interest by comparing the user interest signals of the identified one or more points of interest used to identify the one or more points of interest; identifying a most relevant point of interest from the scored one or more points of interest; determining a notification type that corresponds to the most relevant point of interest and the user interest signal associated with the most relevant point of interest; generating a notification including the most relevant point of interest and the user interest signal, according to the determined notification type; providing the generated notification to the user; determining whether the user acts on the provided notification; and sending a subsequent notification asking the user to generate content for the most relevant point of interest, in a case the user acts on the provided notification.

According to one or more aspects of the subject technology, a computer implemented method for incentivizing creation of user-generated content may include identifying one or more points of interest for including in a notification to a user based on metadata associated with the user. Each of the identified one or more points of interest may be scored based on the user interest signals. A most relevant point of interest may be identified from the scored one or more points of interest. A notification type may be determined that corresponds to the most relevant point of interest and the user interest signal associated with the most relevant point of interest. A notification may be generated that includes the most relevant point of interest and the user interest signal, according to the determined notification type. The generated notification may be provided to the user. A determination may be made of whether the user acts on the provided notification. A subsequent notification may be sent asking the user to generate content for the most relevant point of interest, in a case the user acts on the provided notification.

According to one or more aspects of the subject technology, a system for incentivizing creation of user-generated content may include memory to store instructions and a processor configured to execute the instructions to perform the following acts: identifying one or more points of interest for including in a notification to a user based on metadata associated with the user; scoring each of the identified one or more points of interest based on the user interest signals; identifying a most relevant point of interest from the scored one or more points of interest; determining a notification type that corresponds to the most relevant point of interest and the user interest signal associated with the most relevant point of interest; generating a notification including the most relevant point of interest and the user interest signal, according to the determined notification type; providing the generated notification to the user; determining whether the user acts on the provided notification; and sending a subsequent notification asking the user to generate content for the most relevant point of interest, in a case the user acts on the provided notification.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
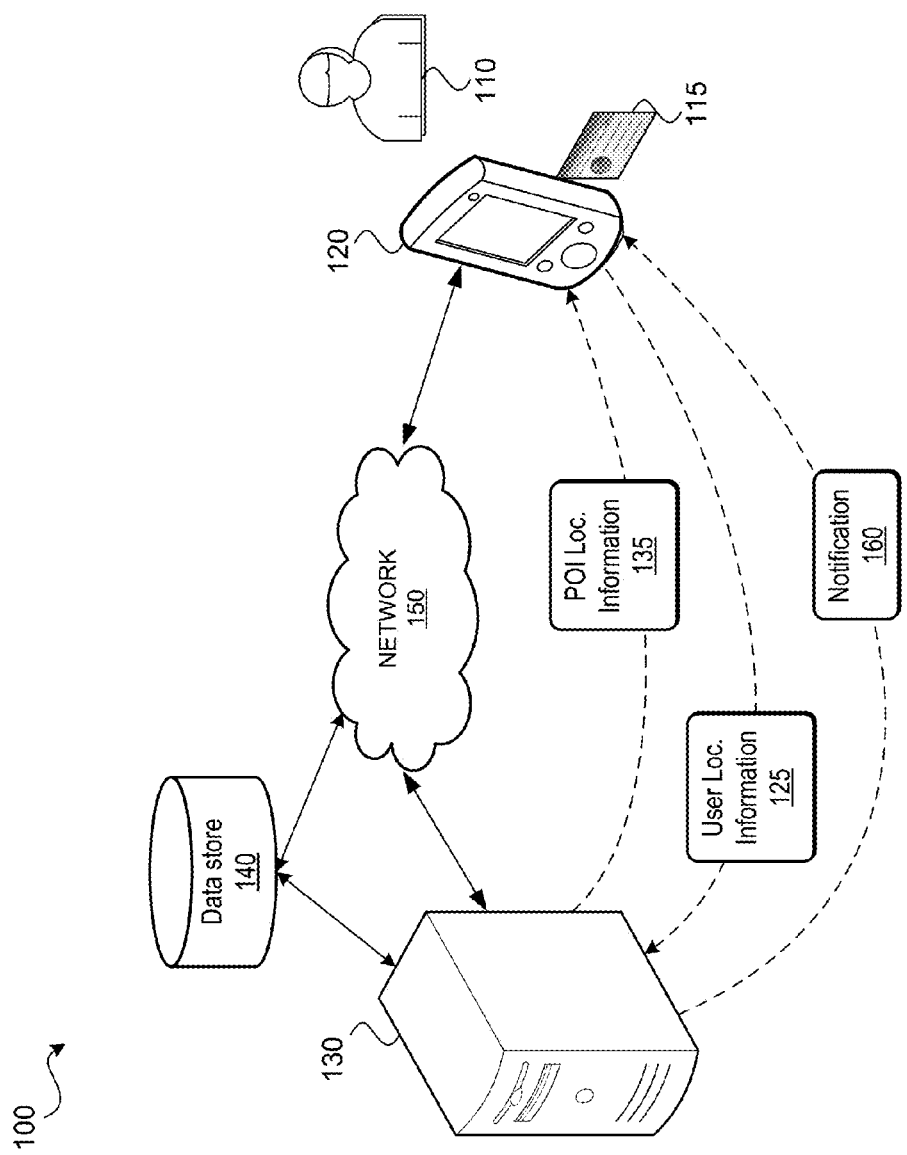
FIG. 1 is a conceptual diagram illustrating an example of a network environment for incentivizing user generated content creation, in accordance with one or more aspects of the subject technology.

In the following detailed description, numerous specific details are set forth to provide a full understanding of the present disclosure. It will be apparent, however, that the implementations of the present disclosure may be practiced without some of these specific details. In other instances, structures and techniques have not been shown in detail so as not to obscure the disclosure.

Methods and systems for incentivizing user generated content (UGC) creation are provided herein. A user's interest in a place such as, for example, a restaurant or a bar (e.g., a point of interest) may be identified from the user's own activity such as indicating in a map application that a particular place is interesting to the user. A user may indicate such interest by placing a star or another symbol on a graphic user element representing a point of interest. The points of interest may be associated with a review site profile or a social network profile. A point of interest may also be identified based on an activity of a user's contact as well as distance between the user and the point of interest. For example, when a user's contact is visiting a bar that is close to the user, the bar may be considered a point of interest for the user.

The user may be incentivized to create UGC, for example, by providing the user with information that can motivate the user to visit a place (e.g., a point of interest, such as business) and spend some time in that place. For instance, the information may be related to a place that the user is interested in, a contact (e.g., a friend) of the user has recommended that place to the user, or a contact of the user has just uploaded one or more photos of the place to a UGC platform (e.g., a social media site). The information may include interesting visual information such as images, videos, or pictures of or related to the place that can encourage the user to visit the place. The information may also relate to an event (e.g., a performance, a concert, a sale, etc.) that is planned to take place in a location near the user. In one or more aspects, a contest for providing content regarding one or more places, for which there is a need for UGC may motivate people to create UGC.

Whether the user is stationary or on the move may also be considered when identifying points of interest. For example, a radius may be used to determine whether or not a point of interest is near the user. The radius may vary depending on the rate/mode of travel of the user. For example, if the rate of travel may indicate that the user is in an automobile, a larger radius may be used than if the rate of travel suggests that the user is walking. The points of interest near a user may be scored based on a number of criteria to determine a most relevant point of interest that can be included in a notification to the user. The user may act on the notification that may prompt a server to send a subsequent notification to the user asking the user to generate content relating to the most relevant point of interest, as described in greater detail herein.

FIG. 1 is a conceptual diagram illustrating an example of a network environment 100 for incentivizing user generated content creation, in accordance with one or more aspects of the subject technology. The network environment 100 includes a server 130, a client device 120 (e.g., a portable communication device, such as a mobile phone) associated with a user 110, a client application 115 running on the client device 120, and a data store 140 communicatively linked together and to other servers, systems, and devices via a network 150. The server 130 may be a stand-alone server or a group of servers maintained by an entity (e.g., a corporation, a data center, etc.). The server 130 may support one or more services offered by the client application 115. For example, the server 130 may provide location services, to the client application 115. The location services may include receiving location information 125 of the client device 120 and providing to the client device 120 the location information 135 relating to one or more points of interest (e.g., restaurants, bars, cafes, sports clubs, stores, shopping centers, etc.) that are located near the current location of the client device 120.

In one or more implementations, The client application 115 may be a single application or a number of applications that allow the user 110 to perform a number of interactions with the client device 120, for example, access one or more social media (e.g., Internet forums, weblogs, social blogs, podcasts, and social network sites), search a location on a map, mark a location on the map, send invitations to contacts (e.g., family, friends, etc.), provide reviews, etc. The data store 140 may be part of the server 130 or a part of distributed data stores coupled through the network 150. The data store 140 may include a variety of information, such as a list of points of interest and for each point of interest tables including a number of attributes including, but not limited to, location coordinates, a type (e.g., restaurant, bar, business, sports, etc.), an address, a contact information, and reviews. The network environment 100 may facilitate incentivizing user generated content creation as disclosed herein. For example the server 130 may send notification 160 to the client device 120 asking the user 110 to generate content related to a point of interest, as described in greater detail herein.

Figure 2:
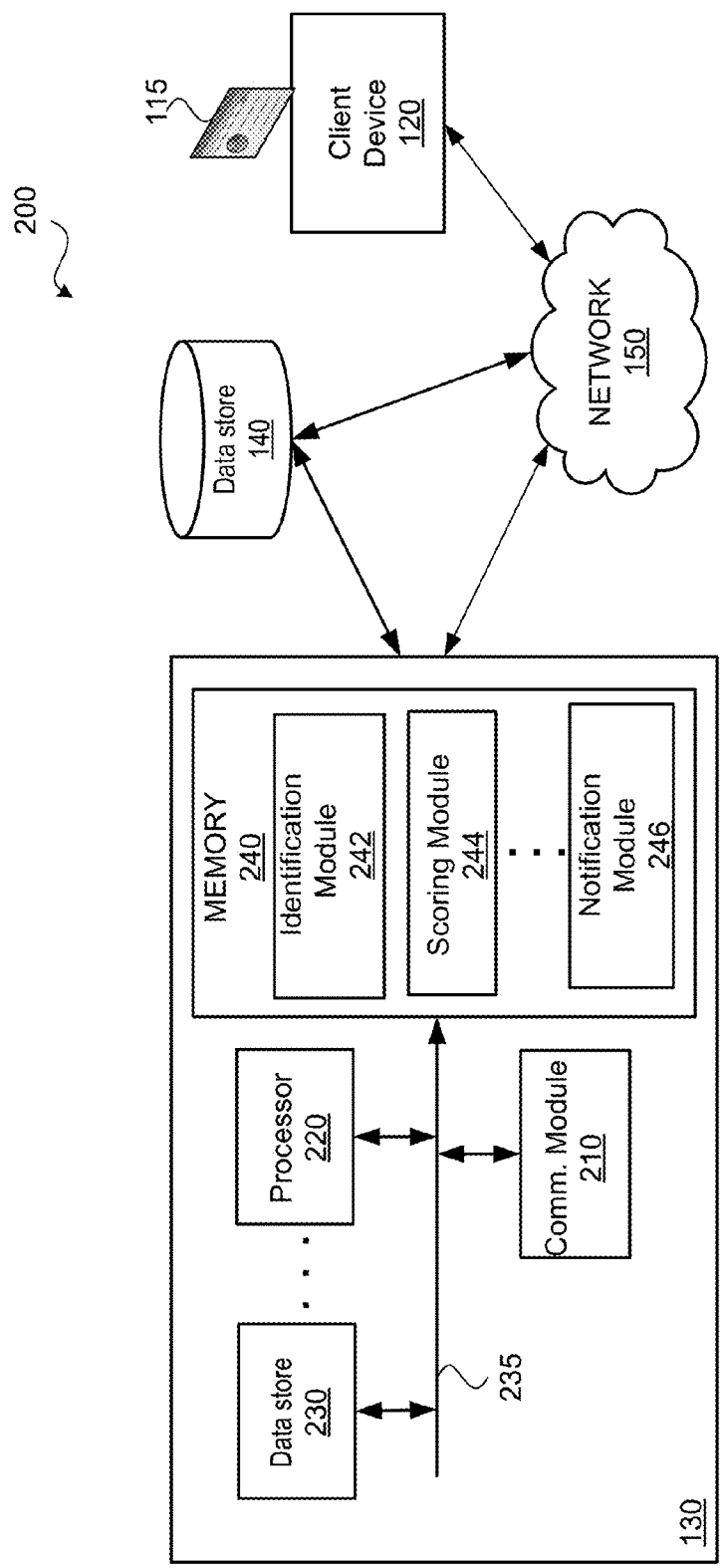
FIG. 2 is a block diagram illustrating an example of a system for incentivizing user generated content creation, in accordance with one or more aspects of the subject technology.

FIG. 2 is a block diagram illustrating an example of a system 200 for incentivizing user generated content creation, in accordance with one or more aspects of the subject technology. The system 200 includes, but may not be limited to, a communication module 210, a processor 220, a data store 230, and memory 240 coupled together via a bus 235. The memory 240 may store data and software modules, for example, an identification module 242, a scoring module 244, and a notification module 246. The identification module 242, the scoring module 244, and the notification module 246 may be executed by the processor 220. In one or more aspects, the functionality of the identification module 242, the scoring module 244, and the notification module 246 may be implemented in hardware, such as a field-programmable gate array (FPGA).

The client device 120 may include any system or device having a processor, a memory, and communications capability for communicating via the network 150. The client device 120 may include a global positioning system (GPS) module. The GPS module may provide location coordinates of the client device 120 in real time. In one or more aspects of the subject technology, the location of the client device 120 may be determined by using cell signals, for example, via multilateration of radio signals between a number of cell towers, network location information such as IP address location, and/or wireless access point location. The client device 120 may report the location coordinates of the client device 120 to the server 130 via the network 150. As noted above, the subject technology determines and communicates location information of the client device. Communication of location information to other devices and/or servers may be enabled with user consent to do so. The location information may be encrypted while being communicated to other devices and/or servers. Location notices may be used to inform and remind users about the use of location information. The location notices may be presented during a device configuration process, during a user onboarding flow, as a persistent reminder within a user interface on the client device, and/or in periodic reminder messages. The location information may be retained for only a limited period of time and user controls may be provided to manage the communication and retention of location information.

The identification module 242 may search the data store 230 or the data store 140 to identify a number of points of interest for including in a notification (e.g., 160 of FIG. 1) to the client device 120. The identification of the points of interest may be based on location information of the client device 120 (e.g., location coordinates received from device 120) and one or more user interest signals.

The user interest signals may include an indication of an interaction by a contact associated with the user with the point of interest. For example, the interaction may include uploading a photo of the point of interest to social media, checking in at the point of interest, and reviewing and/or rating the point of interest. The user interest signals may further include an indication of a user's proximity to the point of interest. For example, the identification module 242 may compare the location coordinates of the point of interest retrieved from the data stores (e.g., 230 and/or 140) with the location coordinates of the client device 120 to estimate a distance between the location of the point of interest and the current location of the client device 120. In one or more aspects, the user interest signals may include an association with a user's online interest history, which is captured by the server 130 and saved in the data store (e.g., 230 and/or 140). The user's online interest history may include showing interest in a place such as a point of interest by the user 110 some time in the past. For example, the user 110 may have indicated that he likes the point of interest or may have given a high rating or provided one or more positive reviews for that point of interest.

Various types of user information have been identified for use in user interest signals. The subject technology may limit or prevent the storage and use of user information absent user consent. Users may be provided with the opportunity to control the types of user information stored and used as well as the duration over which user information may be stored. User information may be encrypted while being stored. Users also may be provided with controls to manage and delete stored user information.

The scoring module 244 may score a number of points of interest identified by the identification module 242. The scoring module 244 may score each of the identified points of interest by comparing the user interest signals associated with that point of interest (e.g., used to identify that point of interest). For example, the scoring module 244 may score each of the identified points of interest by associating a score to each of the identified one or more points of interest based on a number of parameters (as discussed in greater detail below). The parameters may include, for example, an event associated with the identified point of interest or being close to a place for which the user provided a good review or being close to a place for which a contact of the user provided a good review. The parameters may further include a distance between the current location of the user and the identified one or more points of interest, and the need as determined by the server 130 for user generated content for the identified points of interest.

For example, an event associated with the identified point of interest (e.g., a place) may include current presence of a contact of the user 110 in the point of interest, an indication that the user 110 had a desire to be at that place, for instance, by marking that place, or the client device location being near a place that a contact of the user 110 recommended to the user 110. In one or more aspects, the notification module 246 may determine a need for a notification to the user 110 based on the score associated with the most relevant point of interest exceeding a threshold. For example, if the score associated with a point of interest is higher than the threshold or the point interest has the highest score (e.g., the most relevant point of interest), the notification module 246 may generate a notification for being communicated to the user 110. The notification (e.g., 160 of FIG. 1) may be of different type, for example, the notification may include an email notification, a short message service (SMS) notification, an audio notification, or knowledge card notification. The notification module 246 may determine the type of the notification based on metadata associated with the user 110. In one or more aspects, the metadata may include the location of the client device 110 and the user interest signals that associate the point of interest with the user 110.

In one or more implementations of the subject technology, the notification module 246 may generate a notification that, for example, notifies the user 110 that a contact (e.g., a friend)

of the user 110 is in a place (e.g., a point of interest) nearby. In one or more aspects that notification may ask the user 110 if she/he is interested in going to that place. The notification may be communicated to the client device 120 by the communication module 210. The client device 120 (e.g., a mobile phone) may receive the notification, and the user 110 may use the mobile phone to act on the notification. For example, the user 110 may open the notification, copy portions of the content of the notification, or perform a search related to the notification content. For instance, the user 110 may use the client application 115 to search an online map for the place. In one or more aspects, the user 110 may visit the point of interest and spent some time in the point of interest.

The server 130 may be informed of the action of the user 110 on the notification by the client application 115. The notification module 246 may determine that the user 110 acted on the notification. In one or more aspects, the server 130 may be able to determine whether the user 110 visited the point of interest or stayed in the point of interest by examining the location information provided by the client device 120. For example, if the provided location information does not show a change of location for a period of time (e.g., approximately one hour), that can be interpreted that the user 110 spent the one hour at the point of interest. Following the determination, the notification module 246 may generate one or more subsequent notifications asking the user 110 to generate content for the most relevant point of interest, for which the notification was sent to the client device 120. The subsequent notifications may be communicated to the client device 120 via the communication module 210. The subsequent notifications may ask the user 110 to visit the place (e.g., the most relevant point of interest) and generate content for the place identified in the notification (e.g., most relevant point of interest). In one or more aspects, the subsequent notifications may prompt the user 110 to interact with the point of interest, for example, recommend the place or upload a picture of the place. In other aspects, the user 110 may be requested by the subsequent notification to check in and/or comment on the place using social media, or respond to a comment or check-in by a contact of the user 110. The nature of the request may depend on a number of factors, such as the time that the user 110 is spending in the place. For example, if the user 110 is spending more than a few minutes (e.g., 15 minutes) in the place, the user 110 may be motivated to take a picture of the place and upload the picture. If the user 110 spends a few hours in the place, the user may be asked to provide a review for the place. In one or more aspects, the client application 115 may receive the location information of the point of interest (e.g., POI location information 125 of FIG. 1) from the server 130 and provide the information (e.g., on a map) to the user 110.

Referring to server 130, the processor 220 may be a general-purpose processor (e.g., a central processing unit (CPU)), a graphics processing unit (GPU), a microcontroller, a Digital Signal Processor (DSP), an Application Specific Integrated Circuit (ASIC), an FPGA, a Programmable Logic Device (PLD), a controller, a state machine, gated logic, discrete hardware components, or any other suitable entity that can perform calculations or other manipulations of information. The memory 240 may include random access memory (RAM), dynamic RAM (DRAM), static Ram (SRAM), flash memory, etc.

The network 150 may include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of network topologies, including a bus network, a star network, a ring network, a mesh network, a star-bus network, tree or hierarchical network.

The client device 120 may include the client application 115, which may receive the location information of the point of interest (e.g., POI location information 125 of FIG. 1) from the server 130 and provide the information (e.g., on a map) to the user 110. In one or more implementations, the client application 115 may be a single application or a number of applications that allow the user 110 to perform a number of interactions with the client device 120, for example, receive notifications from one or more servers (e.g., server 130), access one or more social media, search a location on a map, mark a location on the map, send invitations to contacts (e.g., family, friends, etc.), create UGC (e.g., upload photos of or related to one or more points of interest, review, or rate one or more points of interest based on a user's experience with the point of interest, etc.), respond to events such as a contact's check in at a place or comment on a review by a contact, and so on.

Figure 3B:
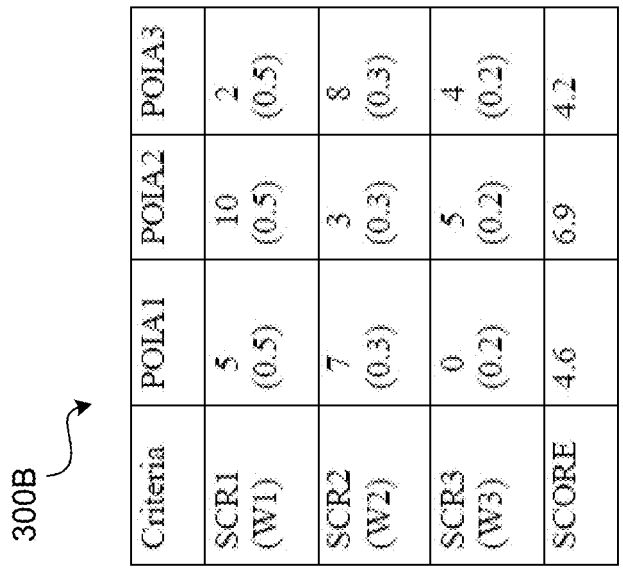
FIG. 3B is a table illustrating an example of scoring of points of interest of FIG. 3A for user generated content creation, in accordance with one or more aspects of the subject technology.
Figure 3A:
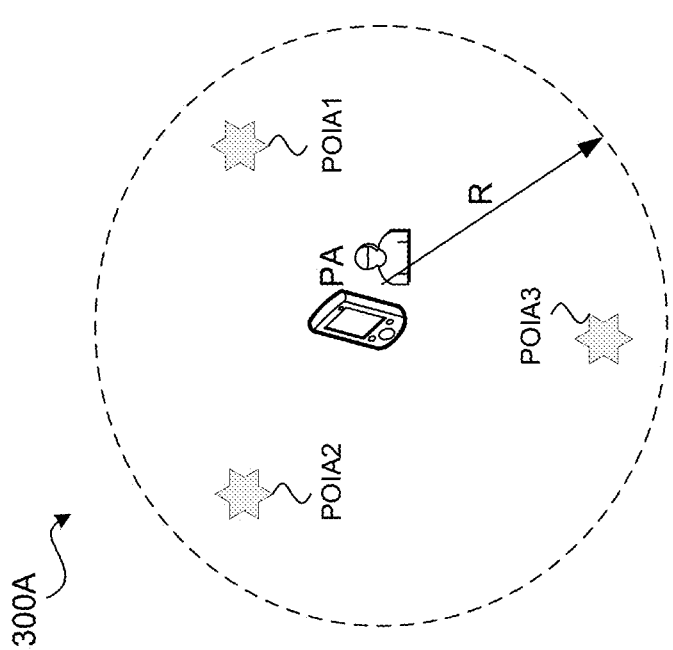
FIG. 3A is a map illustrating examples of points of interest in vicinity of a user location for user generated content creation, in accordance with one or more aspects of the subject technology.

FIG. 3A is a map 300A illustrating examples of points of interest in vicinity of a user location for user generated content creation, in accordance with one or more aspects of the subject technology. The map 300A shows a number of points of interest (e.g., POIA1, POIA2, and POIA3) that are identified by the identification module 242 of FIG. 2, as being proximate to the client device 120 of FIG. 2 located in a position shown as PA. one of the factors or criteria in identifying a place as a point of interest, as mentioned above, may be the distance between the location of the point of interest and the location of the client device 120 (e.g., PA). In one or more aspects, the identification module 242 may consider all points of interest that are within a radius R from the position PA. The radius R may depend on the mobility and speed of mobility of the client device 120, which the server 130 can determine based on the GPS information received from the client device 120. For example, the radius R may be different if the client device 120 is stationary or moving at 1.5 miles/hour (e.g., user 110 is walking) or is moving at a speed such as 60 miles/hr (e.g., user 110 is in a vehicle, such as driving a vehicle). For instance, if the client device 120 is stationary or moving at a walking speed, the radius R may be less than a mile, and if the client device 120 is moving at a typical speed of a vehicle, the radius R may more be longer, for example, less than or equal to 5 miles. As discussed above, the identification module may include other factors such as user interest signals in making a decision about identifying a place as a point of interest.

FIG. 3B is a table 300B illustrating an example of scoring of points of interest of FIG. 3A for user generated content creation, in accordance with one or more aspects of the subject technology. The scoring module 244 of FIG. 2 may score a place identified as a point of interest based on a number of parameters or criteria. For example, the parameters or criteria may include an event associated with the identified place, being close to a place that the user 110 of FIG. 1 provided a good review for, being close to a place that a contact of the user 110 provided a good review for, a distance between current location of the user 110 with the identified place, and need for additional user generated content for the identified place, which can be determined based on lack of specific information for the identified one or more points of interest. For example, the server 130 or an operator the server 130 may identify a number of places (e.g., points of interest) in the data stores 140 or 230 of FIG. 2 that may lack a number of information items such as photos, reviews, ratings, and so on.

Associated with each criterion (e.g., CR1, CR2, CR3, etc.), the scoring module 244 may consider a weighting function (e.g., W1, W2, W3, etc.). The weighting function may depend on the importance of the criterion in defining the final score. Further, depending on the level of fitting of the point of interest to the criterion, the scoring module 244 may assign a raw score (e.g., a number SCR, such as SCR1 for CR1) between, for example, 0 and 10 (e.g., 0 indicating no fit and 10 indicating a complete fit) to the point of interest. The final score for each point of interest may be determined, for example, from:

$$SCORE = SCR1*W1 + SCR2*W2 + SCR3*W3 \qquad (1)$$

Where, SCORE is the final score, W1-W3 are weighing functions, and SCR1-SCR3 are raw scores corresponding to criteria CR1-CR3, respectively. Numerical examples for the raw scores, weighting functions, and the resulting final scores of each of the point of the identified points of interests (e.g., POIA1, POIA2, and POIA3) are shown in table 300B, which is self explanatory. The most relevant point of interest in this case may be POIA2 with a score of 6.9, which is higher than other scores.

Figure 4:
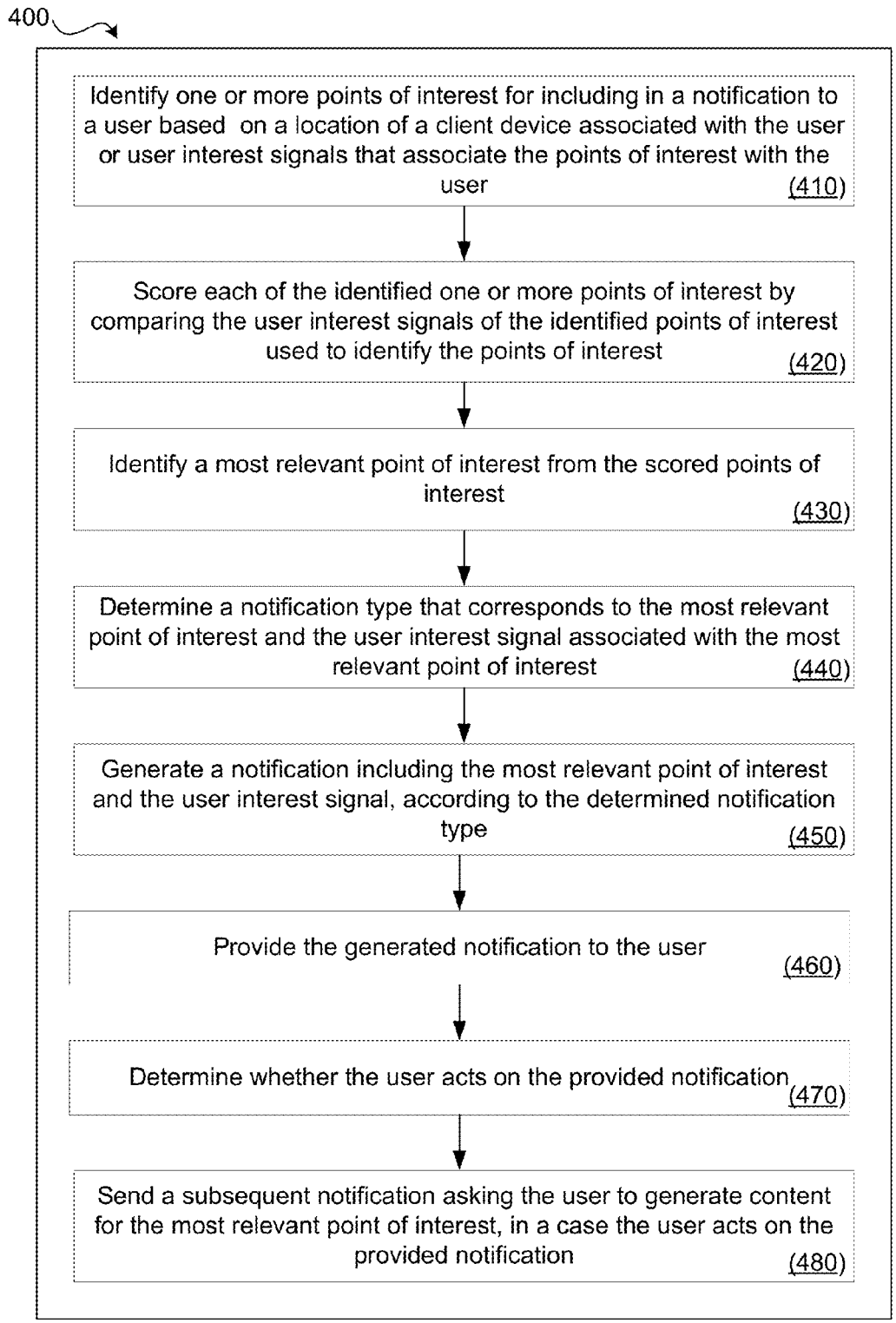
FIG. 4 is a flow diagram illustrating an example of a method for incentivizing user generated content creation, in accordance with one or more aspects of the subject technology.

FIG. 4 is a flow diagram illustrating an example of a method for incentivizing user generated content creation, in accordance with one or more aspects of the subject technology. The method 400 begins with operation block 410, where the identification module (e.g., 242 of FIG. 2) may identify one or more points of interest (e.g., POIA1-POIA3 of FIG. 3A) for including in a notification (e.g., 160 of FIG. 1) to a user (e.g., 110 of FIG. 1) based at least on a location of a client device (e.g., PA of FIG. 3A) associated with the user or user interest signals that associate the points of interest with the user. At operation block 420, the scoring module (e.g., 244 of FIG. 2) may score each of the identified points of interest by comparing the user interest signals of the identified points of interest used to identify the points of interest. At operation block 430, the identification module may identify a most relevant point of interest (e.g., POIA2 of FIGS. 3A and 3B) from the scored one or more points of interest (e.g., POIA1-POIA3 of FIGS. 3A and 3B).

At operation block 440, the notification module (e.g., 246 of FIG. 2) may determine a notification type that corresponds to the most relevant point of interest and the user interest signal associated with the most relevant point of interest. The notification module, at operation block 450, may generate a notification (e.g., 160 of FIG. 1) including the most relevant point of interest and the user interest signal, according to the determined notification type. At operation block 460, the communication module (e.g., 210 of FIG. 2) may provide the generated notification to the user (e.g., via the client device 120). The notification module, at operation block 470, may determine whether the user acts on the provided notification. At operation block 480, the communication module may send a subsequent notification to the client device asking the user to generate content for the most relevant point of interest, in case the user acts on the provided notification.

Figure 5:
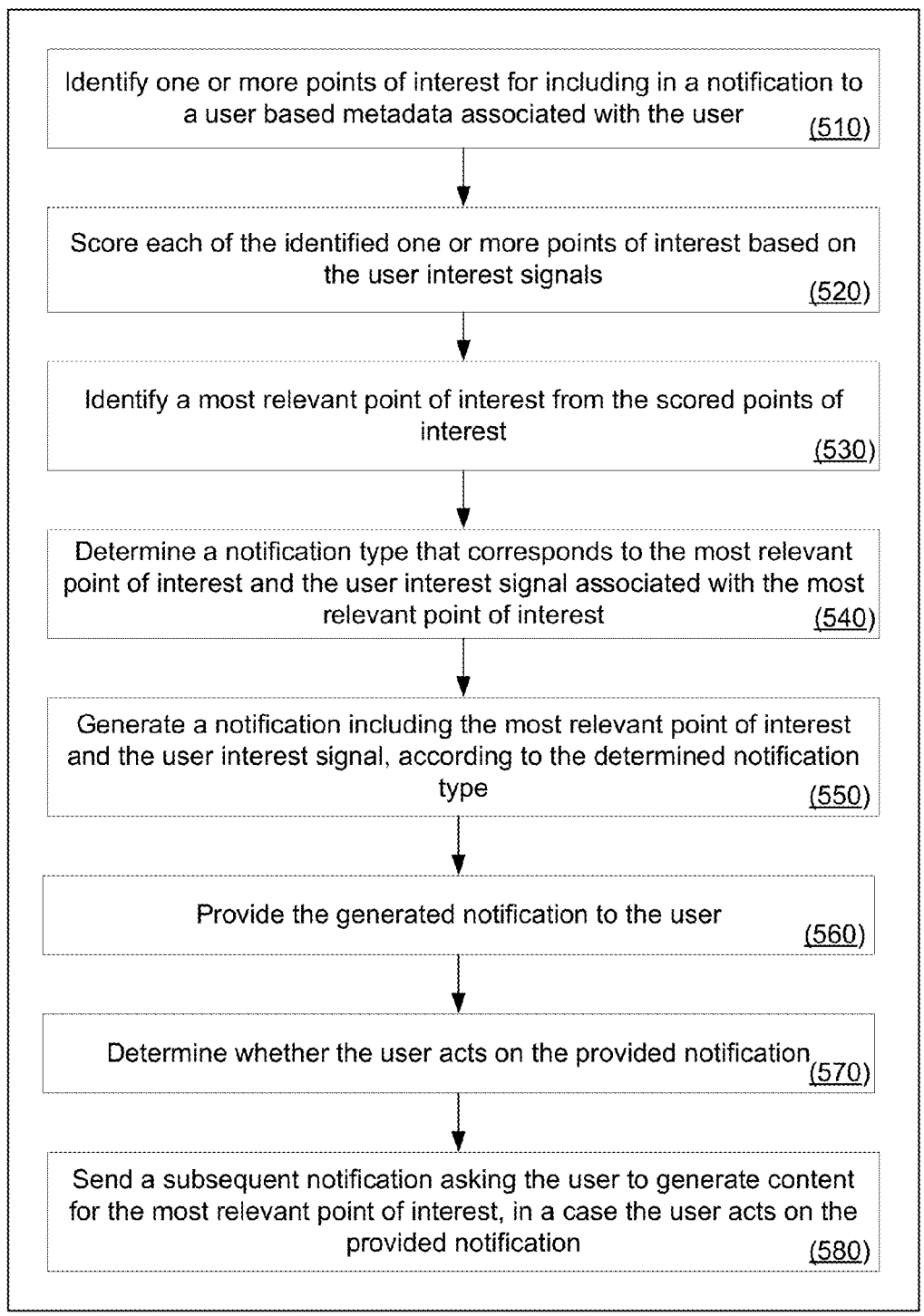
FIG. 5 is a flow diagram illustrating an example of a method for incentivizing user generated content creation, in accordance with one or more aspects of the subject technology.

FIG. 5 is a flow diagram illustrating an example of a method 500 for incentivizing user generated content creation, in accordance with one or more aspects of the subject technology. The method 500 begins at operation block 510, where the identification module (e.g., 242 of FIG. 2) may identify one or more points of interest (e.g., POIA1-POIA3 of FIG. 3A) for including in a notification (e.g., 160 of FIG. 1) to a user (e.g., 110 of FIG. 1) based on metadata associated with the user. At operation block 520, the scoring module (e.g., 244 of FIG. 2) may score each of the identified points of interest based on user interest signals. Description of operation blocks 530-580 is similar to the description of operation blocks 430-480 of method 400 of FIG. 4, and is skipped here for brevity.

Figure 6:
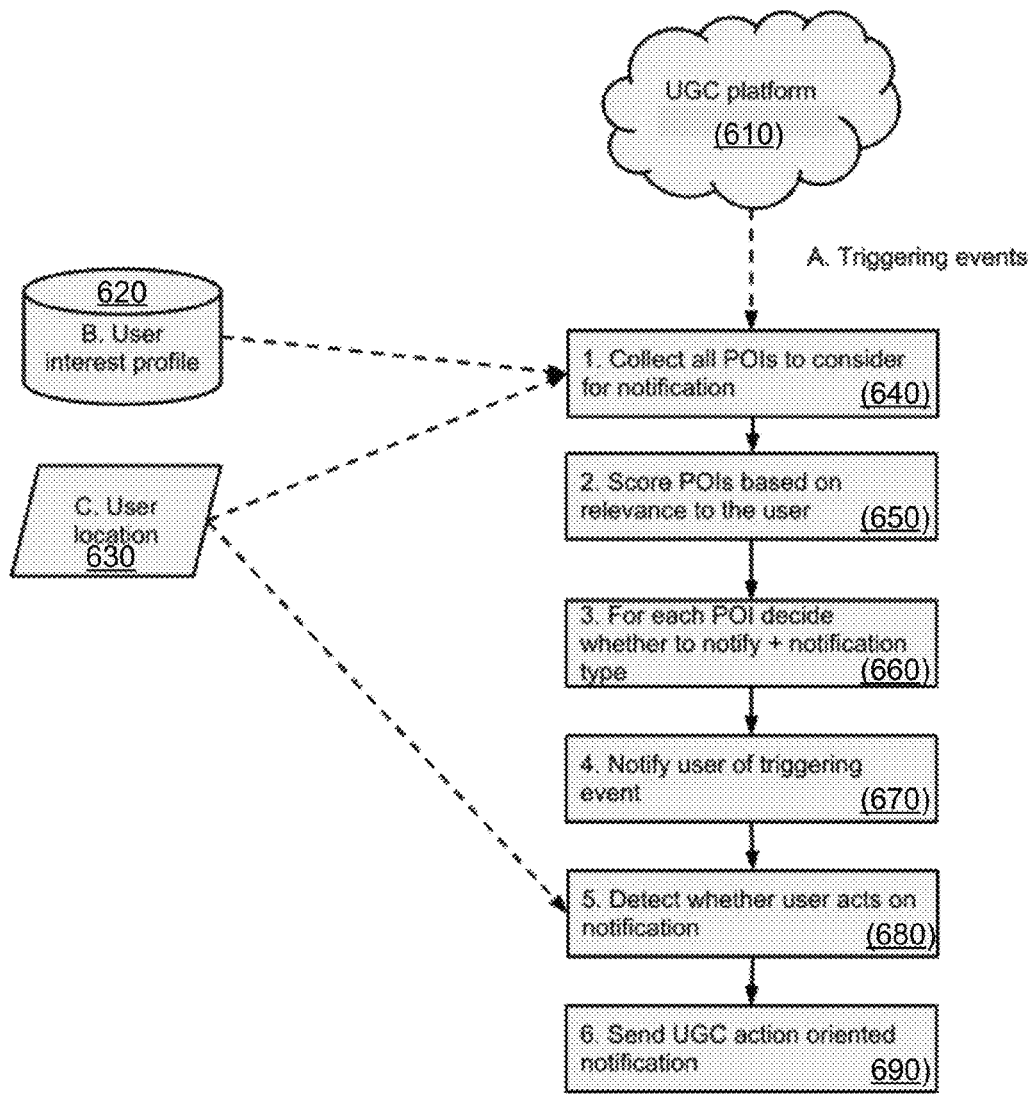
FIG. 6 is a flow diagram illustrating an example of a method for incentivizing user generated content creation, in accordance with one or more aspects of the subject technology.

FIG. 6 is a flow diagram illustrating an example of a method 600 for incentivizing user generated content creation, in accordance with one or more aspects of the subject technology. The method 600 may use a user generated content (UGC) platform 610 (e.g., a social medium) a data store 620 (e.g., a user interest profile data store, which can be the same or a part of the data store 230 or 140 of FIG. 2), and a user location information file 630, which may be stored in memory 240 or in one of data stores 230 or 140. Method 600 may start by one or more triggering events. The triggering event may include a friend interaction with a place (e.g., a business or other potential point of interest) or proximity of the location of the user device 120 of FIG. 1 to a place, information for which is stored in a data store associated with the server 130 of FIG. 1. The friend interaction with a place may include checking in at a place that is of interest to the user 110 of FIG. 1 or uploading a photo to a UGC platform (e.g., one or more social media site), reviewing, or rating the place in the UGC platform. The server 130 may continuously examine stored information related to places that are near the user device 120 and determine whether any of the places is of interest to the user 110. The server 130 may make the determination based on interactions retrieved from the UGC platform or a user interest profile 620. The interactions may include, for example, the user 110 starred the place or marked the place as 'want to go'; the place was recommended to the user 110 by a friend of the user 110; the place is similar to the users taste (e.g., people similar o the user liked the place); or a friend of the user 110 has been at the place recently.

At operation block 640, information (e.g., location information) relating to a number of points of interest (POIs) are retrieved from data store 620 and are considered for including in a notification (e.g., 160 of FIG. 1) to the user bases on a location information (e.g., obtained from the user location file 630) of a client device (e.g., 120) associated with the user (e.g., 110 of FIG. 1) or user interest signals that associate the points of interest with the user.

At operation block 650, the scoring module (e.g., 244 of FIG. 2) may score the POIs based on a number of factors including relevance to the user, as discussed above with respect to FIG. 3B. At operation block 660, for each POI determination is made whether to notify the user and, and if it was determined to notify the user, the type of the notification is decided based on the most relevant point of interest to the user and the user interest signal associated with the most relevant point of interest. For example, if the user interest signals indicate that the user 110 cares about the event to be notified of, a more active (e.g., an 'in-your-face') notification may be provided, whereas for other events a more passive notification type may be considered. At operation block 680, the notification module (e.g., 246 of FIG. 2) may detect whether the user acted on the notification. At operation block 690, the communication module (e.g., 210 of FIG. 2) may send a UGC action oriented notification to the user, as described above with respect to FIG. 2.

The term "machine-readable storage medium" or "computer readable medium" as used herein refers to any medium or media that participates in providing instructions or data to processor 220 of FIG. 2 for execution. Such a medium may take many forms, including, but not limited to, non-volatile media, volatile media, and transmission media. Non-volatile media include, for example, optical disks, magnetic disks, or flash memory, such as data store devices 230 or 140 of FIG. 2. Volatile media include dynamic memory, such as memory 240 of FIG. 2. Transmission media include coaxial cables, copper wire, and fiber optics, including the wires that comprise bus 235 of FIG. 2. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims. These and other implementations are within the scope of the following claims.

What is claimed is:

1. A computer-implemented method for incentivizing creation of user-generated content, the method comprising:
    identifying one or more points of interest for including in a notification to a user based at least on a location of a client device associated with the user and user interest signals that associate the points of interest with the user;
    scoring each of the identified one or more points of interest by comparing the user interest signals of the identified one or more points of interest used to identify the one or more points of interest;
    identifying a most relevant point of interest from the scored one or more points of interest;
    determining a notification type that corresponds to the most relevant point of interest and the user interest signal associated with the most relevant point of interest;
    generating a notification including the most relevant point of interest and the user interest signal, according to the determined notification type;
    providing the generated notification to the user;
    determining whether the user acts on the provided notification; and
    sending a subsequent notification asking the user to generate content for the most relevant point of interest, in a case the user acts on the provided notification.

2. The computer-implemented method of claim 1, wherein scoring each of the identified one or more points of interest is performed based on a plurality of parameters comprising:
    an event associated with the identified one or more points of interest,
    being close to a place that the user provided a good review for,
    being close to a place that a contact of the user provided a good review for,
    a distance between current location of the user with the identified one or more points of interest, and
    need for additional user generated content for the identified one or more points of interest, the need determined based on lack of specific information for the identified one or more points of interest.

3. The computer-implemented method of claim 2, wherein identifying the most relevant point of interest from the scored one or more points of interest comprises:
    scoring each of the identified one or more points of interest based on a need for user to generate content; and
    identifying a point of interest with a greatest need for a user to generate content.

4. The computer-implemented method of claim 3, wherein a score associated with the scored one or more points of interest comprises a weighted sum of the plurality of parameters, and the method comprises determining a highest scored point of interest.

5. The computer-implemented method of claim 4, further comprising determining a need for a notification to the user based on the score associated with the most relevant point of interest exceeding a threshold.

6. The computer-implemented method of claim 1, wherein:
the notification type comprises an email notification, a short message service (SMS) notification, an audio notification, or a knowledge card notification, and
determining the notification type is based on metadata associated with the user.

7. The computer-implemented method of claim 1, wherein determining whether the user acts on the provided notification comprises determining whether the user performs at least one of visiting the most relevant point of interest, spending time in the most relevant point of interest, opening the notification, copying portions of content of the notification, or performing a search related to the notification.

8. The computer-implemented method of claim 1, wherein asking the user to generate content for the most relevant point of interest comprises prompting the user to interact with the most relevant point of interest, and wherein interacting with the most relevant point of interest comprises performing at least one of: recommending, uploading a picture of, using social media to check in or comment on the most relevant point of interest, or respond to a comment or check in by a contact of the user.

9. The computer-implemented method of claim 1, wherein:
user interest signals comprise:
an indication of an interaction with the point of interest by a contact associated with the user,
an indication of a user's proximity to the point of interest, and
an association with a user's online interest history, and
wherein an interaction with the point of interest by the contact associated with the user comprises at least one of:
uploading a photo of the point of interest,
checking in the point of interest,
reviewing the point of interest, or
rating the point of interest based on a user's experience with the point of interest.

10. A system for incentivizing creation of user-generated content, the system comprising:
memory to store instructions; and
a processor configured to execute the instructions to:
identify one or more points of interest for including in a notification to a user based at least on metadata associated with the user;
score each of the identified one or more points of interest based on user interest signals;
identify a most relevant point of interest from the scored one or more points of interest;
determine a notification type that corresponds to the most relevant point of interest and the user interest signal associated with the most relevant point of interest;
generate a notification including the most relevant point of interest and the user interest signal, according to the determined notification type;
provide the generated notification to the user;
determine whether the user acts on the provided notification; and
send a subsequent notification asking the user to generate content for the most relevant point of interest, in a case the user acts on the provided notification.

11. The system of claim 10, wherein:
the metadata associated with the user comprises a location of a client device associated with the user and user interest signals that associate the points of interest with the user, and
the user interest signals comprise the user interest signals of the identified one or more points of interest used to identify the one or more points of interest.

12. The system of claim 11, wherein the processor is further configured to execute the instructions to ask the user to generate content for the most relevant point of interest by prompting the user to interact with the most relevant point of interest, and wherein interacting with the most relevant point of interest comprises performing at least one of: recommending, uploading a picture of, using social media to check in and/or comment on the most relevant point of interest, or respond to a comment or check in by a contact of the user.

13. The system of claim 10, wherein the processor is further configured to execute the instructions to score each of the identified one or more points of interest by associating a score to each of the identified one or more points of interest based on a plurality of parameters comprising:
an event associated with the identified one or more points of interest,
being close to a place that the user provided a good review for,
being close to a place that a contact of the user provided a good review for,
a distance between current location of the user with the identified one or more points of interest, and
need for additional user generated content for the identified one or more points of interest, the need being determined based on lack of specific information for the identified one or more points of interest.

14. The system of claim 13, wherein the processor is further configured to execute the instructions to identify the most relevant point of interest from the scored one or more points of interest by using the score associated with the scored one or more points of interest, and wherein the score associated with the scored one or more points of interest comprises a weighted sum of the plurality of parameters, and the processor is further configured to execute the instructions to determine a highest scored point of interest.

15. The system of claim 13, wherein the processor is further configured to execute the instructions to determine a need for a notification to the user based on the score associated with the most relevant point of interest exceeding a threshold.

16. The system of claim 10, wherein:
the notification type comprises an email notification, a short message service (SMS) notification, an audio notification, or a Now knowledge card notification,
the processor is further configured to execute the instructions to determine the notification type based on metadata associated with the user, and
the metadata comprises the location of the client device associated with the user and the user interest signals that associate the points of interest with the user.

17. The system of claim 10, wherein the processor is further configured to execute the instructions to determine whether the user acts on the provided notification by determining whether the user performs at least one of visiting the most relevant point of interest, spending time in the most relevant point of interest, opening the notification, copying portions of content of the notification, or performing a search related to the notification.

18. The system of claim 10, wherein:
    user interest signals comprise:
        an indication of an interaction with the point of interest by a contact associated with the user,
        an indication of a user's proximity to the point of interest, and
        an association with a user's online interest history, and wherein:
    an interaction with the point of interest by the contact associated with the user comprises at least one of:
        uploading a photo of the point of interest,
        checking in the point of interest,
        reviewing the point of interest, or
        rating the point of interest based on a user's experience with the point of interest.

19. A non-transitory machine-readable medium comprising instructions stored therein, which when executed by a machine, cause the machine to perform operations comprising:
    identifying one or more points of interest for including in a notification to a user based metadata associated with the user;
    scoring each of the identified one or more points of interest based on user interest signals;
    identifying a most relevant point of interest from the scored one or more points of interest;
    determining a notification type that corresponds to the most relevant point of interest and the user interest signal associated with the most relevant point of interest;
    generating a notification including the most relevant point of interest and the user interest signal, according to the determined notification type;
    providing the generated notification to the user;
    determining whether the user acts on the provided notification; and
    sending a subsequent notification asking the user to generate content for the most relevant point of interest, in a case the user acts on the provided notification.

20. The non-transitory machine-readable medium of claim 19, wherein:
    the metadata associated with the user comprises a location of a client device associated with the user and user interest signals that associate the points of interest with the user,
    the user interest signals comprise the user interest signals of the identified one or more points of interest used to identify the one or more points of interest,
    scoring each of the identified one or more points of interest further comprises associating a score to each of the identified one or more points of interest based on a plurality of parameters comprising:
        an event associated with the identified one or more points of interest,
        a distance between current location of the user with the identified one or more points of interest, and
        need for additional user generated content for the identified one or more points of interest, the need being determined based on lack of specific information for the identified one or more points of interest;
    the score associated with the scored one or more points of interest comprises a weighted sum of the plurality of parameters, and
    the instructions further comprise:
        determining a highest scored point of interest; and
        determining that a notification has to be generated based on the score associated with the most relevant point of interest, and wherein, and
    determining whether the user acts on the provided notification comprises determining whether the user performs at least one of opening the notification, copying portions of content of the notification, or performing a search related to the notification.

* * * * *